(12) United States Patent
Denham et al.

(10) Patent No.: US 7,711,653 B1
(45) Date of Patent: May 4, 2010

(54) SYSTEM AND METHOD FOR FACILITATING CUSTOMER SERVICE UTILIZING EMBEDDED CLIENT FEEDBACK LINKS

(75) Inventors: Martha L. Denham, Seattle, WA (US); Kimberly A. Rachmeler, Seattle, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1698 days.

(21) Appl. No.: 10/668,043

(22) Filed: Sep. 22, 2003

(51) Int. Cl.
*G06F 17/60* (2006.01)
*G06F 17/00* (2006.01)
*G06F 13/14* (2006.01)
*G06F 3/048* (2006.01)

(52) U.S. Cl. .................. 705/304; 705/1.1; 705/305; 705/346; 706/45; 709/218; 709/202; 709/203; 707/10; 707/513; 707/1; 715/152; 715/711

(58) Field of Classification Search ............... None
See application file for complete search history.

(56) References Cited

U.S. PATENT DOCUMENTS

| | | | | |
|---|---|---|---|---|
| 6,052,737 | A * | 4/2000 | Bitton et al. ............ | 709/248 |
| 6,170,007 | B1 * | 1/2001 | Venkatraman et al. ...... | 709/218 |
| 6,377,944 | B1 * | 4/2002 | Busey et al. ............ | 707/3 |
| 6,671,714 | B1 * | 12/2003 | Weyer et al. ............ | 709/203 |
| 6,785,679 | B1 * | 8/2004 | Dane et al. ............. | 707/10 |
| 7,251,658 | B2 * | 7/2007 | Dane et al. ............. | 707/10 |
| 7,370,277 | B1 * | 5/2008 | Canfield et al. ......... | 715/752 |
| 2001/0034843 | A1 * | 10/2001 | Hess ................... | 713/201 |
| 2002/0032591 | A1 * | 3/2002 | Mahaffy et al. ......... | 705/8 |
| 2003/0061520 | A1 * | 3/2003 | Zellers et al. .......... | 713/202 |
| 2003/0163380 | A1 * | 8/2003 | Vaccarelli et al. ....... | 705/26 |
| 2005/0010857 | A1 * | 1/2005 | Shmukler et al. ........ | 715/500 |
| 2005/0071477 | A1 * | 3/2005 | Evans et al. ........... | 709/228 |
| 2008/0195674 | A1 * | 8/2008 | Kim et al. ............. | 707/203 |

OTHER PUBLICATIONS

Cybershop.com Enhances Email Marketing Capability; PR Newswire. New York: Nov. 19, 1999. p. 1.*
Users Herald Benefits of Mail-Enabled Applications, Brown Bob, Network World; Nov. 4, 1991; ABI/Inform Global, p. 4.*
Scantron Technologies to Offer Survey Web Hosting Services; PR Newswire. New York: Apr. 1, 1999. p. 1.*
Aldrich, Susan E., "NetReflector InstantSurvey for Customer Feedback," *Strategic Research Service*, Patricia Seybold Group, Mar. 28, 2002.
"Athena," LeisureSoft.com, © 2001, <http://www.leisuresoft.com/athena/intro.html> [retrieved Apr. 12, 2003].

(Continued)

*Primary Examiner*—John G. Weiss
*Assistant Examiner*—Matthew L. Brooks
(74) *Attorney, Agent, or Firm*—Christensen O'Connor Johnson Kindness PLLC

(57) ABSTRACT

A system, method and computer-readable medium for facilitating customer service feedback utilizing embedded feedback links are provided. A consumer generates an inquiry to a service provider. The service provider generates a responsive communication that includes at least one feedback link embedded within the response communication. The consumer can manipulate the feedback link to instantiate a variety of actions, including the escalation of the consumer inquiry.

41 Claims, 6 Drawing Sheets

OTHER PUBLICATIONS

"Autoresponder FAQ's. Autoresponders UK," Auto-Responder.co.uk, © 2003, <http://www.auto-responder.co.uk/faq.htm> [retrieved Apr. 12, 2003].

"Autoresponder Review: Essential Guide to Email Autoresponders," Autoresponder-Review.com, n.d.,<http://www.autoresponder-review.com/> [retrieved Apr. 12, 2003].

"Autoresponder," GetResponse.com, © 2003, <http://www.getresponse.com/> [retrieved Apr. 12, 2003].

"Cisco E-mail Manager," Messageman.co.uk, n.d., <http://www.messageman.co.uk/collaboration/Products/CiscoEmailManager/> [retrieved Apr. 12, 2003].

"Company Profile," SurveySite.com, © 2002, <http://www.surveysite.com/newsite/docs/profile.htm> [retrieved Apr. 10, 2003].

"Email and Web Survey," ExploreCommerce.com, © 2003, http://www.explorecommerce-email-marketing.com/email_marketing_survey.asp> [retrieved Apr. 10, 2003].

"E-Mail Surveys," SurveySite.com, © 2002, <http://www.surveysite.com/newsite/docs/email.htm> [retrieved Apr. 10, 2003].

"Evaluating Web Sites and Other Electronic Resources," Oct. 20, 2000, <http://www.langara.bc.ca/vnc/eval.htm> [retrieved Apr. 10, 2003].

"Express Feedback™," PlanetFeedback.com © 2003 <http://biz.planetfeedback.com/bizsite/products_expressfeedback.jsp> [retrieved Apr. 12, 2003].

"Inside Technique: Popup Surveys: Defining a Survey," SiteExperts.com, © 2001, <http://www.insidedhtml.com/tips/html/ts06/page2.asp> [retrieved Apr. 10, 2003].

"Inside Technique: Popup Surveys: Server-side Processing," SiteExperts.com, © 2001, <http://www.insidedhtml.com/tips/html/ts06/page3.asp> [retrieved Apr. 10, 2003].

"Instant Survey Key Features," NetReflector.com, © 2002, <http://www.netreflector.com/key-features.shtm> [retrieved Apr. 10, 2003].

Isaacs, S., "Inside Technique: Popup Surveys," SiteExperts.com, © 2001, <http://www.insidedhtml.com/tips/html/ts06/page1.asp> [retrieved Apr. 10, 2003].

"Microsoft.com Research Panel," © 2004, <http://www.microsoft.com/mscorp/marketing_research/021016newsletter.htm> [retrieved Apr. 10, 2003].

"Our Commitment to Good Methodology," SuperSurvey.com, © 2003, <http://www.supersurvey.com/methodology.htm> [retrieved Apr. 10, 2003].

"Pop Up Surveys to Measure Ad Effectiveness," WebSurveyor.com, © 2003, <http:/www.websurveyor.com/learn_news0201_bp.asp> [retrieved Apr. 10, 2003].

"Pop-Up' Survey Methodology," SurveySite.com, © 2002, <http://www.surveysite.com/newsite/docs/popsoft.htm> [retrieved Apr. 10, 2003].

"PromaSoft AutoResponder—Email Automation," AutoReplying.com © 2002, <http://www.autoreplying.com/screenshots.htm> [retrieved Apr. 12, 2003].

"PromaSoft Autoresponder Overview," AutoReplying.com © 2003, <http://www.autoreplying.com/overview.htm> [retrieved Apr. 12, 2003].

"Provider Directory," SurveyComplete.com, © 2004, <http://www.surveycomplete.com/directory/0-1-169-394a.html> [retrieved Apr. 10, 2003].

"Quickly Send Email Survey Invitations!" WebSurveyor.com, © 2003, <http://www.websurveyor.com/prod_pricesemail.asp> [retrieved Apr. 10, 2003].

"Shopping Cart Analysis," SurveySite.com, © 2002, <http:www.surveysite.com/newsite/docs/shopping.htm> [retrieved Apr. 10, 2003].

"SuperSurvey™ A Solution From Tercent, Inc.: Product Overview & Specifications," Tercent.com, © 2001, <http://www.supersurvey.com> [retrieved Apr. 10, 2003].

"SuperSurvey™ Help Terms," SuperSurvey.com, © 2001, Tercent, Inc. <http://www.supersurvey.com/help/distribution_text.htm> [retrieved Apr. 10, 2003].

"SuperSurvey™ Product Specs v1.0," SuperSurvey.com, © 2001, Tercent, Inc. <http://www.supersurvey.com/specs.htm> [retrieved Apr. 10, 2003].

"Survey Tracker HTML-Based E-Mail Information Page," SurveyTracker.com, © 2003, <http:/www.surveytracker.com/htm/software/emailhtml.htm> [retrieved Apr. 12, 2003].

"SurveySite Success Stories," SurveySite.com, © 2002, <http:www.surveysite.com/newsite/docs/client.htm> [retrieved Apr. 10, 2003].

"SurveyTracker Plus E-Mail/Web 3.0," SurveyTracker.com, © 2003, <http://surveytracker.com/htm/software/plusmail.htm> [retrieved Apr. 12, 2003].

"System Features and Capabilities," SurveyPro.com, © 2003 <http://surveypro.com/info/features.html> [retrieved Apr. 11, 2003].

"Web Pop-Up Survey," Planet eMarketing.net, n.d., <http://www.planeti.net/english/txt-401T.html> [retrieved Apr. 10, 2003].

"Web Site Evaluation," SurveySite.com, © 2002, <http://www.surveysite.com/newsite/docs/howork.htm> [retrieved Apr. 10, 2003].

"Web-Based Surveys," SurveySite.com, © 2002, <http://www.surveysite.com/newsite/docs/webbased.htm> [retrieved Apr. 10, 2003].

* cited by examiner

SYSTEM AND METHOD FOR FACILITATING CUSTOMER SERVICE UTILIZING EMBEDDED CLIENT FEEDBACK LINKS

FIELD OF THE INVENTION

The present invention is directed to utilizing client feedback to facilitate customer service, and in particular, to a system and method for processing customer service inquiries utilizing messages having embedded feedback links.

BACKGROUND OF THE INVENTION

Consumer relations is a key component for merchants offering products or services. In one aspect, a merchant can focus on providing efficient purchase mechanisms for end consumers to encourage repeat purchases and/or recommendations to other consumers. In another aspect, the merchant can focus on providing efficient customer services mechanisms to establish clear communication channels for consumer feedback. The ability to resolve consumer feedback, such as a consumer inquiry, can often result in a consumer making a purchase or becoming a repeat customer.

In a traditional merchant model, a merchant may provide one or more customer service agents in a physical location to take consumer inquiries and attempt to resolve any outstanding issues. If the customer service agent is not capable of resolving an initial consumer inquiry, the agent can escalate the issue and involve additional customer service agents, such as a manager/supervisor. As part of the escalation process, the merchant may obtain live feedback from the consumer about whether the customer service agent(s) and the merchant's customer service processes were adequate.

The development and evolution of computer communication networks, such as the Internet, provides a new environment for merchants to reach consumers. In one common embodiment, a merchant utilizes a network interface, such as a World Wide Web ("Web") site, to offer products/services for sale. In such an environment, consumers interface with merchants through the network interface, such as a Web browser software application, and/or by additional communication mechanisms, such as electronic mail ("email"). Accordingly, purchases between the consumer and the merchant can be completed without any physical interaction between the parties. Such transactions are generally referred to as electronic commerce, or e-commerce, transactions.

Typically, an e-commerce merchant focuses on the mechanisms and features that promote efficient e-commerce transactions for consumers. However, because there is generally little or no physical interaction between the consumer and the merchant, customer service may be more difficult to accomplish properly. Many e-commerce merchants include some type of customer service mechanism that allows a consumer to send a consumer inquiry to the merchant. For example, e-commerce merchants can provide network-based consumer inquiry forms that transmit a consumer inquiry to the merchant via the communication network. Additionally, e-commerce merchants can publish specific electronic mail addresses that accept consumer inquiries. Once the merchant has obtained the consumer inquiry, most merchants attempt to resolve the consumer inquiry and notify the consumer with a responsive communication, typically in the form of an electronic mail message.

Although many merchants provide some form of customer service that allows a consumer to send consumer inquiries and receive a response, conventional e-commerce methodologies do not provide an efficient manner to escalate consumer inquiries that are not initially resolved by the response from the merchant. In one aspect, some e-commerce merchants provide an electronic mail address that a user can utilize to provide additional feedback. However, the electronic address approach can be deficient in that there is little control of the type of consumer feedback that the merchant will receive. Further, this approach also requires the user to initiate additional tasks, e.g., the free-form creation of an electronic mail, to provide feedback. In another aspect, some e-commerce merchants send consumers follow up messages that include some type of survey, either directly embedded in the message or accessed via a communication network link, for the consumer to complete. The follow up survey approach is generally not effective because consumers are typically not inclined to fill out surveys from merchants. Moreover, because the survey is transmitted as a separate message, this approach is not effective to allow a consumer to escalate a consumer inquiry at the time the escalation is needed.

Thus, there is a need for a customer service solution that provides an efficient framework for obtaining consumer inquiry feedback, including the ability to escalate an unresolved consumer inquiry.

SUMMARY OF THE INVENTION

A system, method and computer-readable medium for facilitating customer service feedback utilizing embedded feedback links are provided. A consumer generates an inquiry to a service provider. The service provider generates a responsive communication that includes at least one feedback link embedded within the response communication. The consumer can manipulate the feedback link to instantiate a variety of actions, including the escalation of the consumer inquiry.

In accordance with an aspect of the present invention, a method for processing customer service inquiries is provided. A service provider obtains a customer service inquiry from a client. The client is associated with an electronic mail reply address. The service provider generates a responsive communication corresponding to the client that includes one or more information components, such as a response from a customer service agent and an embedded unresolved customer service feedback link. The service provider transmits the responsive communication to the client at the electronic mail reply address associated with the client. The service provider may subsequently receive a user selection of the embedded unresolved customer service feedback link. The service provider generates an escalated customer service query in response to the selection of the embedded unresolved customer service feedback link.

In accordance with another aspect of the present invention, a method for processing customer service inquiries is provided. The service provider obtains a customer service inquiry from a client. The client is associated with an electronic mail reply address. The service provider generates a responsive communication to the inquiry from the client. The responsive communication includes one or more information components corresponding to a response from a customer service agent, a first embedded link corresponding to feedback of an unresolved customer service inquiry and a second embedded link corresponding to feedback of a resolved customer service inquiry. The service provider transmits the responsive communication to the client at the electronic mail reply address associated with the client and obtains a user selection of the first or second embedded link. The service provider processes the feedback associated with the user selection of the first or second embedded link. The service provider then generates a responsive action corresponding to the processing of the feedback associated with the user selection.

In accordance with a further aspect of the present invention, a computer-readable medium having computer-executable components for processing customer service inquiries is provided. The computer-readable medium includes a responsive communication component including one or more information components corresponding to a response to a customer service inquiry from a customer service agent. The computer-readable medium also includes an embedded unresolved inquiry component corresponding to an indication of an unresolved response to the customer service inquiry and including a first link to a service provider. Additionally, the computer-readable medium includes an embedded resolved inquiry component corresponding to an indication of a resolved response to the customer service inquiry and including a second link to the service provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a customer service system and method for processing feedback from consumers. More specifically, the present invention relates to a system and method for providing customer service mechanisms utilizing embedded consumer feedback links in electronic messages. The embedded links are directly accessible by the consumer and are used to instantiate additional consumer feedback actions. In one aspect, an embedded negative feedback link provides a mechanism to escalate a consumer inquiry if the merchant response is not adequate. In another aspect, the additional inclusion of an embedded positive feedback link provides a mechanism to customize a merchant acknowledgement of the positive feedback. The merchant may process the consumer responses individually or in aggregate. Although the present invention will described with regard to specific communication mechanisms and communication networks, such as electronic mail and the Internet, one skilled in the relevant art will appreciate that the disclosed embodiments are illustrative in nature and should not be construed as limiting. Further, although the present invention will be described with regard to illustrative message formats and displays, these examples should not be construed as limiting.

Figure 1:
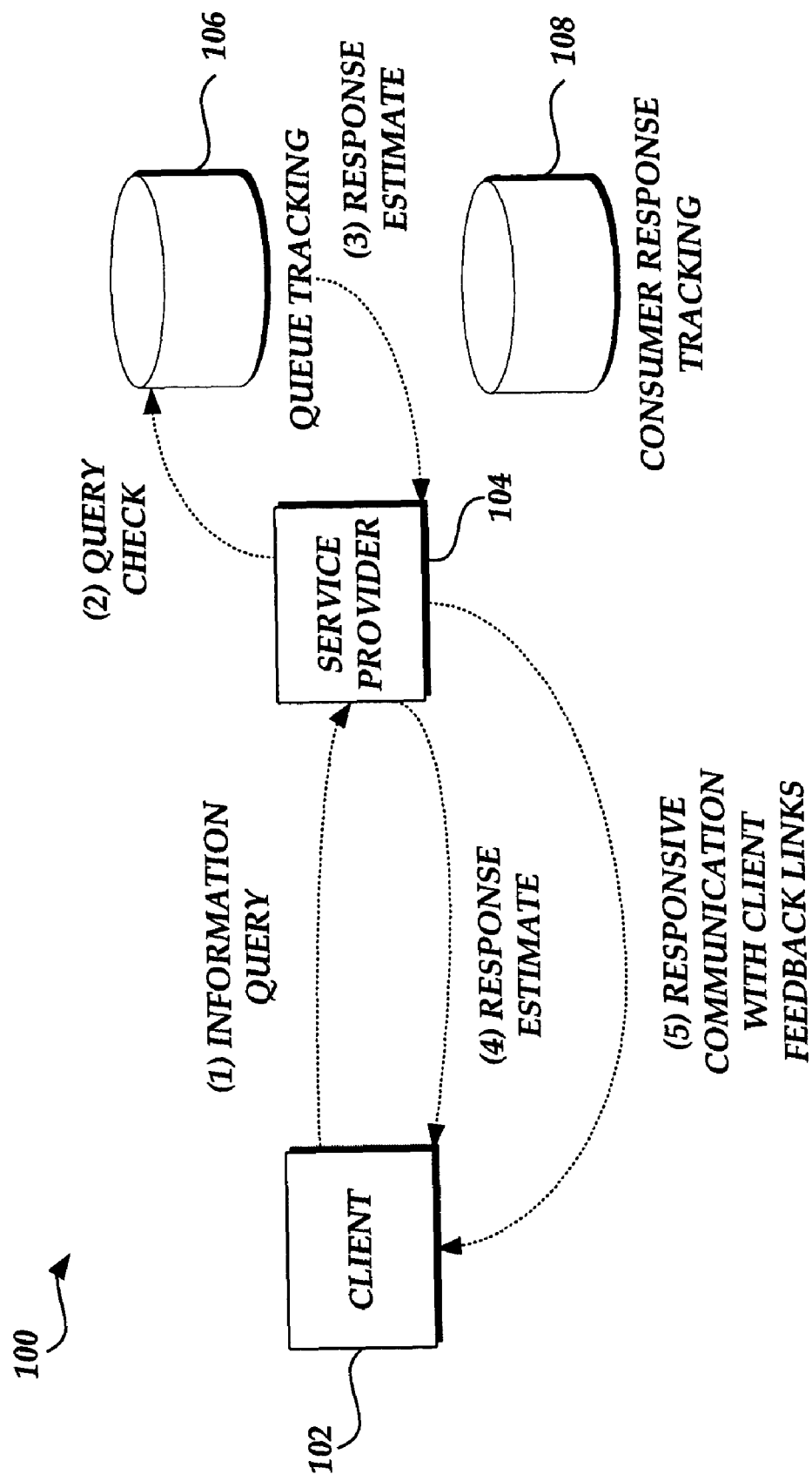
FIG. 1 is block diagram of a customer service system illustrating the processing of a consumer inquiry from a client computing device by a service provider in accordance with the present invention.

FIG. 1 is a block diagram of a customer service system 100 that can be implemented in a communication network, such as the Internet. The customer service system 100 can include one or more client computing devices 102 that access the communication network. In an illustrative embodiment of the present invention, the client computing devices 102 can include any one of a variety of computing devices, including, but not limited to, personal computers, personal digital assistants, hand-held computing devices, telephones, server computing devices, and the like. In communication with the client computing device 102 is a service provider computing device 104 that corresponds to an on-line merchant/service provider that interacts with consumers via the communication network. In an illustrative embodiment of the present invention, the service provider computing device 104 may be directly provided by a merchant/service provider. Alternatively, the service provider computing device 104 may be provided by a third-party, such as an outsourcing agent. Further, the service provider computing device 104 may be exclusive to a particular merchant or may correspond to a grouping of merchants.

The service provider computing device 104 can include various data repositories corresponding to various transactions including a queue tracking data repository 106 and a consumer response data repository 108. In an illustrative embodiment of the present invention, the queue tracking data repository 106 is utilized to track the number of pending consumer inquiries and estimate a response time from the merchant. The consumer response data repository 108 is utilized to track data associated with consumer inquiries and responses. In an illustrative embodiment of the present invention, the data tracked from each consumer inquiry in the consumer response data repository 108 can include copies of the consumer inquiries and responses, dates of communication, whether or not the consumer inquiry was resolved, a geographic location of the consumer, the identification of the customer service agent attempting to resolve the consumer inquiry, a classification of the type of consumer inquiry, and/or comments provided by the consumer. The consumer response data repository 108 can also the consumer feedback data in aggregate to generate, or otherwise obtain, transaction aggregate data, consumer aggregate data, and/or customer agent aggregate data. One skilled in the relevant art will appreciate that the consumer response data repository may be distributed among several data repositories designated to provide particular storage/processing functionality. Further, one skilled in the relevant art will appreciate that the customer service system 100 can include a number of additional components that would be utilize to facilitate communications between client computing devices 102 and service provider computing devices 104.

As illustrated in FIG. 1, the client computing device 102 initiates a customer service inquiry that is transmitted to the service provider computing device 104. In an illustrative embodiment of the present invention, the service provider computing device 104 can provide an on-line form, such as a Web page, that allows a user at the client computing device 102 to complete necessary information and transmit it to the service provider. Alternatively, the client computing device 102 can generate a communication, such as an electronic mail message or text message, that is directly transmitted to the service provider computing device 104. Still further, the consumer inquiry may be submitted via an alternate communication medium, such as telephone, facsimile, letter, and the like, that is received by a corresponding merchant. In such an embodiment, the alternate media consumer inquiry may transformed internally, or otherwise processed by the merchant, such that the inquiry can be processed as if the inquiry was received through the communication network.

Upon receiving the initial customer service inquiry, the service provider computing device 104 begins processing the customer service inquiry. As part of the processing, the service provider computing device 104 can generate an estimate for the completion of a response to the customer service inquiry. In one embodiment, the estimate for the completion of a response corresponds to dividing the number of pending customer service queries to be answered (from the query tracking data repository 106) by an estimated rate for completion of a response. The estimated rate for completion can correspond to an actual current rate of completion or an approximated rate of completion based upon statistical data. In another embodiment, the estimate for completion of a response can correspond to a prioritization of a response to a subset of consumers. For example, some consumers can pay for specific levels of customer service, and/or qualify for alternative customer service based on selection criteria. If the client corresponding to the customer service inquiry corresponds to one or more of the subsets of consumers qualified for an alternative response time, the estimate for a response will be different. In one example, the estimate for completion of a response may be a guaranteed amount of time regardless of the number of queries pending in the query tracking data repository 106. For example, a consumer may pay for a service contract that guarantees a response within fifteen minutes. In another example, the estimate for completion of a response may be calculated in the manner described above with a specially selected rate of completion. For example, the merchant may assign different rates of completion for different consumers, or sets of consumers. Similarly, the merchant may assign different rates of completion according to the subject matter of the consumer inquiry. For example, the merchant can assign different rates of completion for order tracking inquiries than company policy feedback inquiries. One skilled in the relevant art will appreciate that a number of additional methods of calculating estimates for completion of a response and/or varying estimates for completion of a response can be utilized in accordance with the present invention. The resulting number can be embodied in an electronic message sent to the client or otherwise displayed on a merchant Web site. Once the service provider generates and transmits the estimate for completion of a response, the service provider computing device 104 generates a response to the consumer inquiry. The service provider response can be automatically generated, at least in part, by utilizing one or more automatic response generating algorithms. For example, the merchant can maintain predefined language that can be utilized to respond to particular consumer inquiries. Alternatively, the consumer inquiry response can be generated individually by customer service agents associated with the service provider. Further, the customer service agent can be provided with the ability to choose particular predefined language to include in a response. The merchant response is transmitted to the client. In an illustrative embodiment of the present invention, the consumer inquiry response is embodied as an electronic mail message that is transmitted to the client at one or more e-mail addresses associated with the client.

Figure 3:
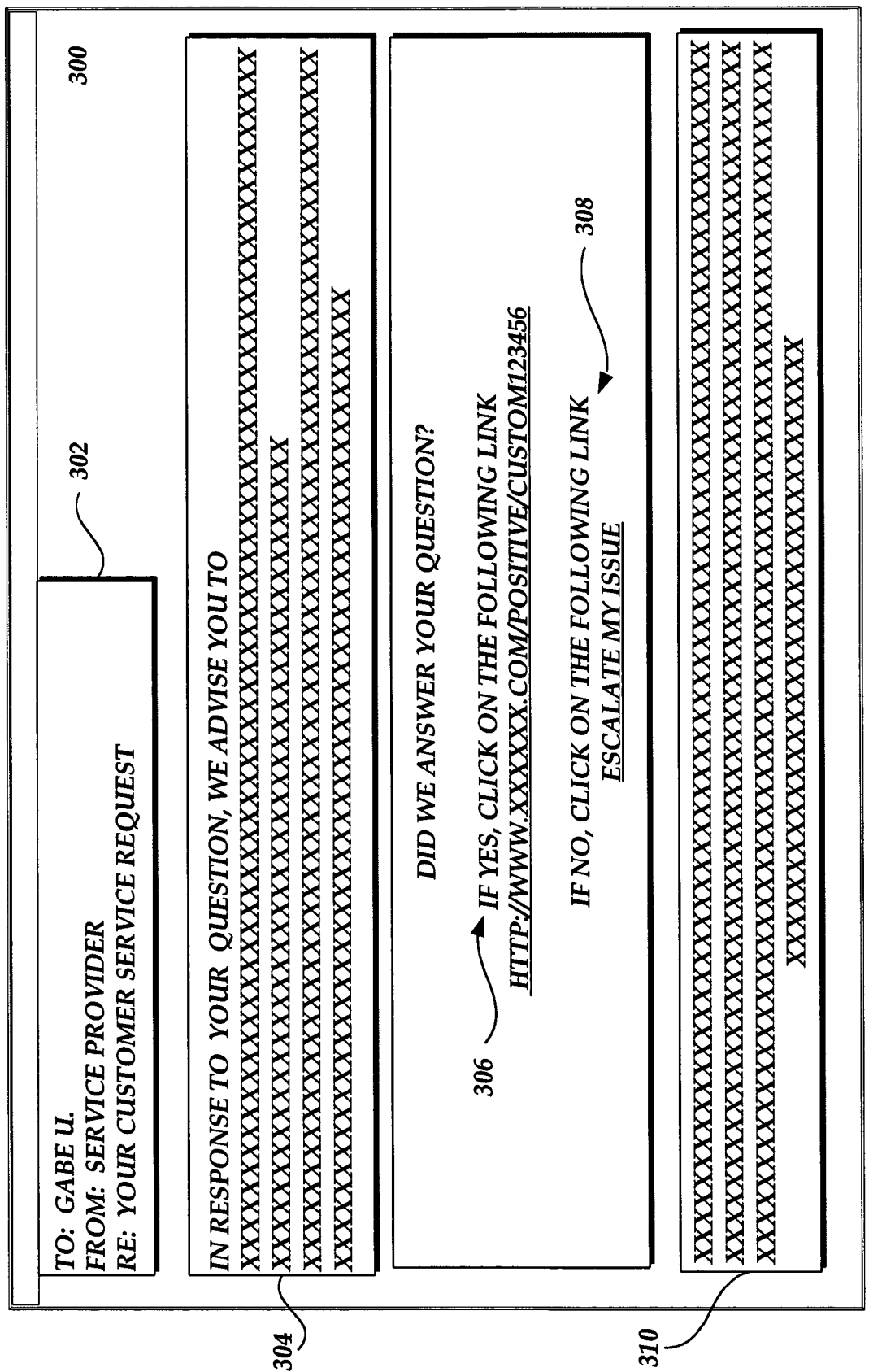
FIG. 3 is a block diagram illustrative of an illustrative consumer inquiry response from a service provider including embedded consumer inquiry feedback links formed in accordance with the present invention.

FIG. 3 is a block diagram illustrative of a consumer inquiry response 300 generated by a service provider computing device 104. The consumer inquiry response 300 can include a standard electronic mail routing and identification portion 302 identifying the consumer, the service provider and any reference or tracking numbers provided by the service provider and/or the consumer. The consumer inquiry response 300 can also include a responsive communication portion 304, 310 including one or more information components corresponding to a response to the consumer inquiry. The information components can include text and/or graphics provided by the service provider that correspond in some manner to the original consumer inquiry. As illustrated in FIG. 3, the responsive communication portion 304, 310 may be broken into various subparts. Alternatively, the responsive communication portion may be a single part.

The consumer inquiry response 300 can also include an embedded positive feedback link 306 portion that instantiates some action when selected by a user. In an illustrative embodiment of the present invention, the positive feedback link 306 corresponds to a hyptertext transfer protocol ("HTTP") link embedded in the response 300 that causes the client computing device 102 to initiate a request for content via the communication network. The positive feedback link 306 can be a general link that corresponds to a standard positive feedback content request. The positive feedback link 306 can pass a variety of information that may be utilized by the service provider computing device 104, such as an consumer inquiry identifier, a customer service agent identifier, time information, and the like. Further, activation of the positive feedback link 306 can also cause the client computing device to send additional identification information stored on the client computing device, such as a user name or user identifier, for use in processing the request. For example, the request for content can correspond to a customized thank you page, as will be described in greater detail below. As illustrated in FIG. 3, the positive feedback link 306 is a custom generated link that can be matched to a particular consumer inquiry or group of inquiries. In this manner, the merchant computing device 104 can store and recall information associated with the consumer inquiry if the link is utilized. Further, the custom positive feedback link 306 can also be associated with expiration data, such as an expiration date or one time use limitation, that will cause the customized link to expire.

The consumer inquiry response 300 can also include an embedded negative feedback link 308 portion that instantiates a different action when selected by a user. Similar to the positive feedback link 306 portion, the negative the negative feedback link 308 corresponds to a HTTP link embedded in the response 300 that causes the client computing device 102 to initiate a request for an escalated consumer inquiry, as will be described in greater detail below. In one embodiment, the negative feedback link 306 may be a general link that corresponds to a standard negative feedback content request. Additionally, similar to the positive feedback 306, the negative feedback 308 can include additional information utilized by the server provider to process the negative feedback. In an alternative embodiment, the negative feedback link 308 can be a customized link similar to the customized feedback link described with regard to the positive feedback link 306. The consumer inquiry response 300 includes text and/or graphics that readily identify the positive feedback link 306 and the negative feedback link 308 to the consumer. Additionally, as illustrated with in FIG. 3, the negative feedback link 306 may be displayed in the consumer inquiry response 300 with graphics and text such that the contents of the link are not readily visible to a user. For example, the link may be displayed as a graphic image created utilizing a markup language, such as the hypertext markup language ("HTML").

As illustrated in FIG. 3, in an illustrative embodiment of the present invention, the positive feedback link 306 portion and the negative feedback link 308 portion can be located in between the responsive communication portion 304 to improve visibility to the consumer. Alternatively, the positive feedback link 306 portion and the negative feedback link 308 portion may be located at other locations, such as the top or bottom of the electronic message. Additionally, although the consumer inquiry response 300 is illustrated as having both the positive feedback link 306 portion and the negative feedback link 308 portion, one skilled in the relevant art will appreciate that the consumer inquiry response can include only a negative feedback link 308. Further in another alternative embodiment of the present invention, additional special purpose links may be added to the consumer inquiry response 300. For example, in the event that additional consumer information is required, a consumer feedback link for providing additional information may be provided in an initial consumer inquiry response 300. Accordingly, the positive and negative feedback links 306, 308 would not be provided until the additional information is processed. In an additional aspect of the present invention, the positive feedback link 306 and negative feedback link 308 may be embedded within the consumer inquiry response 300 after a merchant customer agent has reviewed, drafted and/or modified the responsive communication portion 304, 310. The embedding of the links after the generation of the responsive communication portion 304, 310 provides a manner to avoid modification of the links by a customer service agent.

Although the consumer inquiry response 300 is illustrated as an electronic mail message, the consumer inquiry response can configured for display in alternative display formats, such as in short message service or on-line messaging applications. Further, although the positive feedback link 306 and the negative feedback link 308 are described as be utilized as an HTTP content request, one skilled in the relevant art will appreciate that the links may be utilized to initiate alternative forms of communication with a corresponding merchant, including, but not limited to, voice over IP, real time conferencing, instant messaging, landline telephone calls, and the like.

Figure 2A:
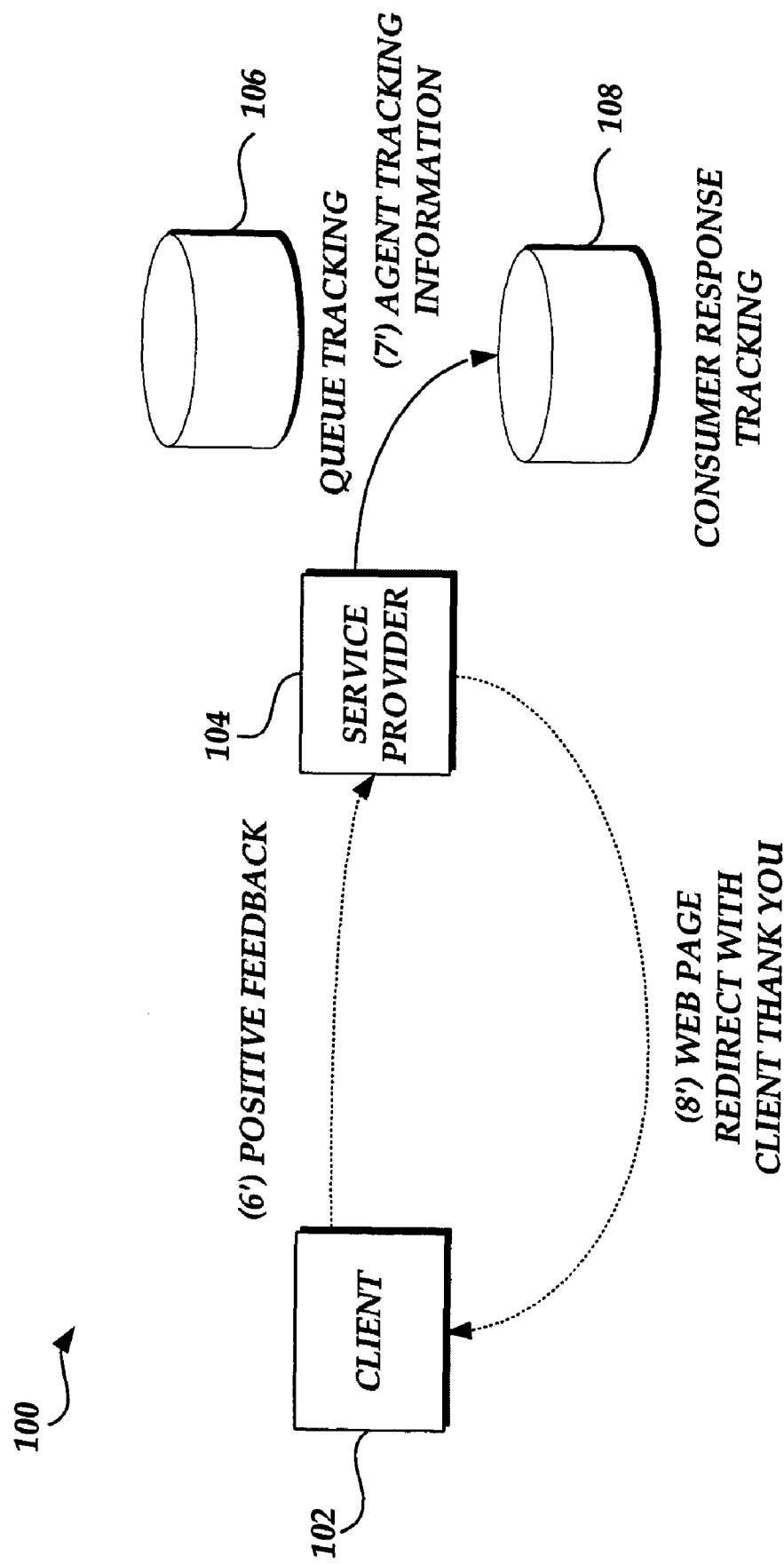
FIGS. 2A and 2B are block diagrams of the customer service system of FIG. 1 illustrating the transmittal of feedback by the client computing device to the service provider in accordance with the present invention.

Turning now to FIG. 2A, in a first alternative, a user selects the positive feedback link 306 (FIG. 3), that instantiates a specialized content request from the service provider computing device 104. The service provider computing device 104 receives the content request from the client computing device 102 and processes the information included in the request. In one aspect, the service provider computing device 104 can utilize the embedded customer service agent identification information in the positive feedback link to update the customer response data tracking repository 108 to indicate a successful consumer inquiry response. In an illustrative embodiment of the present invention, customer response data tracking repository 108 can track and process consumer responses as well be described in greater detail below.

In another aspect, the service provider computing device 104 can generate a second responsive communication acknowledging the positive feedback. The second responsive communication may be another electronic message transmitted to the user. Alternatively, the second response communication may be a Web page generated on the client computing device 102. In an illustrative embodiment of the present invention, the Web page can correspond to a consumer site provided by the merchant to encourage additional transactions. Further, the Web page can be customized to acknowledge the particular user, such as a personalized thank you on the Web page.

Figure 4:
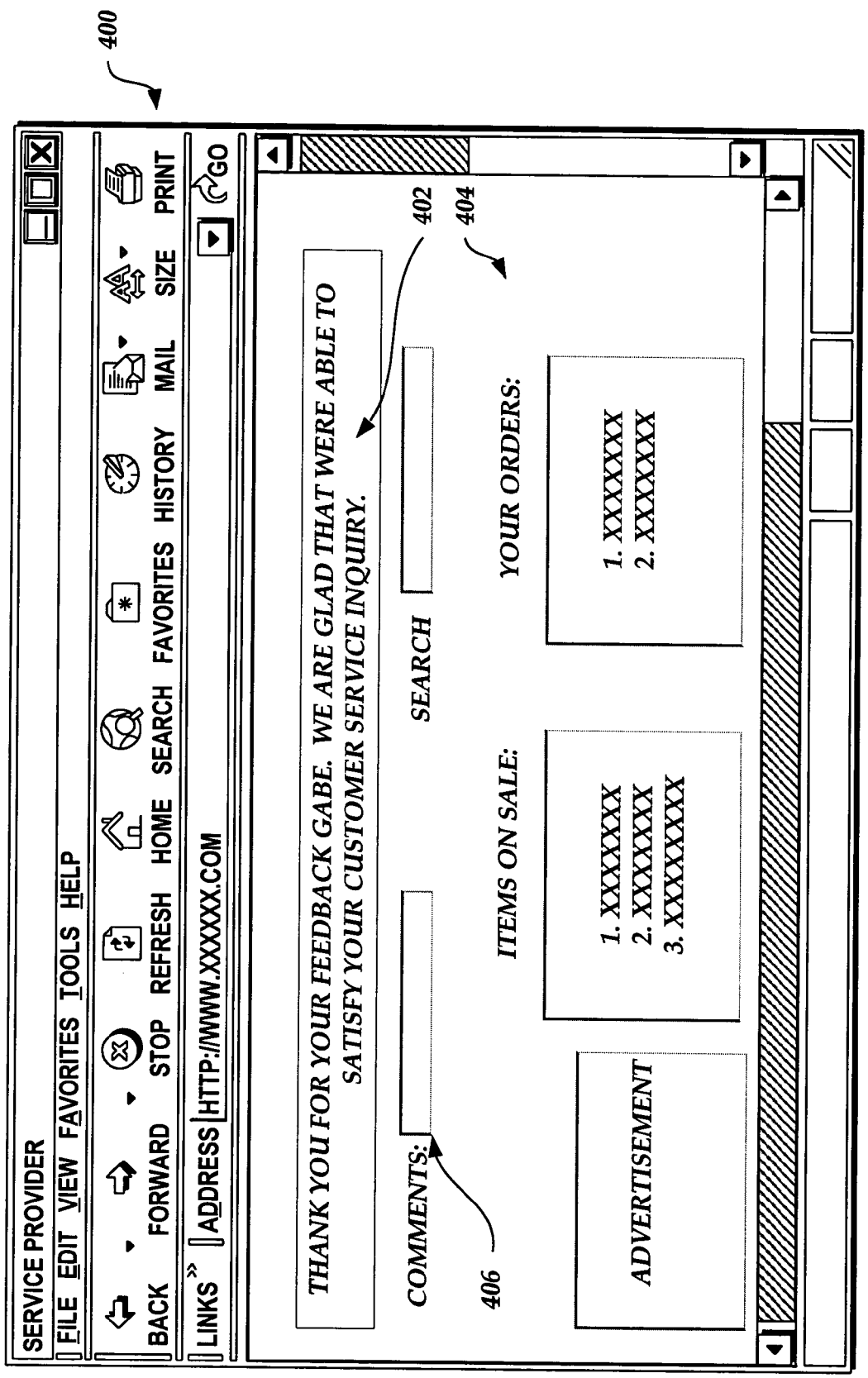
FIG. 4 is a block diagram illustrative of a screen display generated by a client computing device corresponding to the receipt of positive feedback by a service provider in accordance with the present invention.

FIG. 4 is a block diagram illustrative of a screen display 400 generated by the client computing device 102 corresponding to the receipt of positive feedback. The screen display 400 corresponds to a traditional graphical user interface Web browser software application screen display having a variety of navigational and file controls for the user. As illustrated in FIG. 4, the screen display 400 includes a first portion 402 corresponding to a customized textual and graphical acknowledging the receipt of the positive feedback from the consumer. Additionally, the screen display 400 includes a second portion 404 corresponding to the merchant's consumer mechanisms to encourage additional transactions. Still further, the screen display 400 can include a comment portion 406 for obtaining additional consumer comments regarding the resolution of the consumer inquiry. One skilled in the relevant art will appreciate that additional and/or alternative screen display configurations may be practiced with the present invention.

Figure 2B:
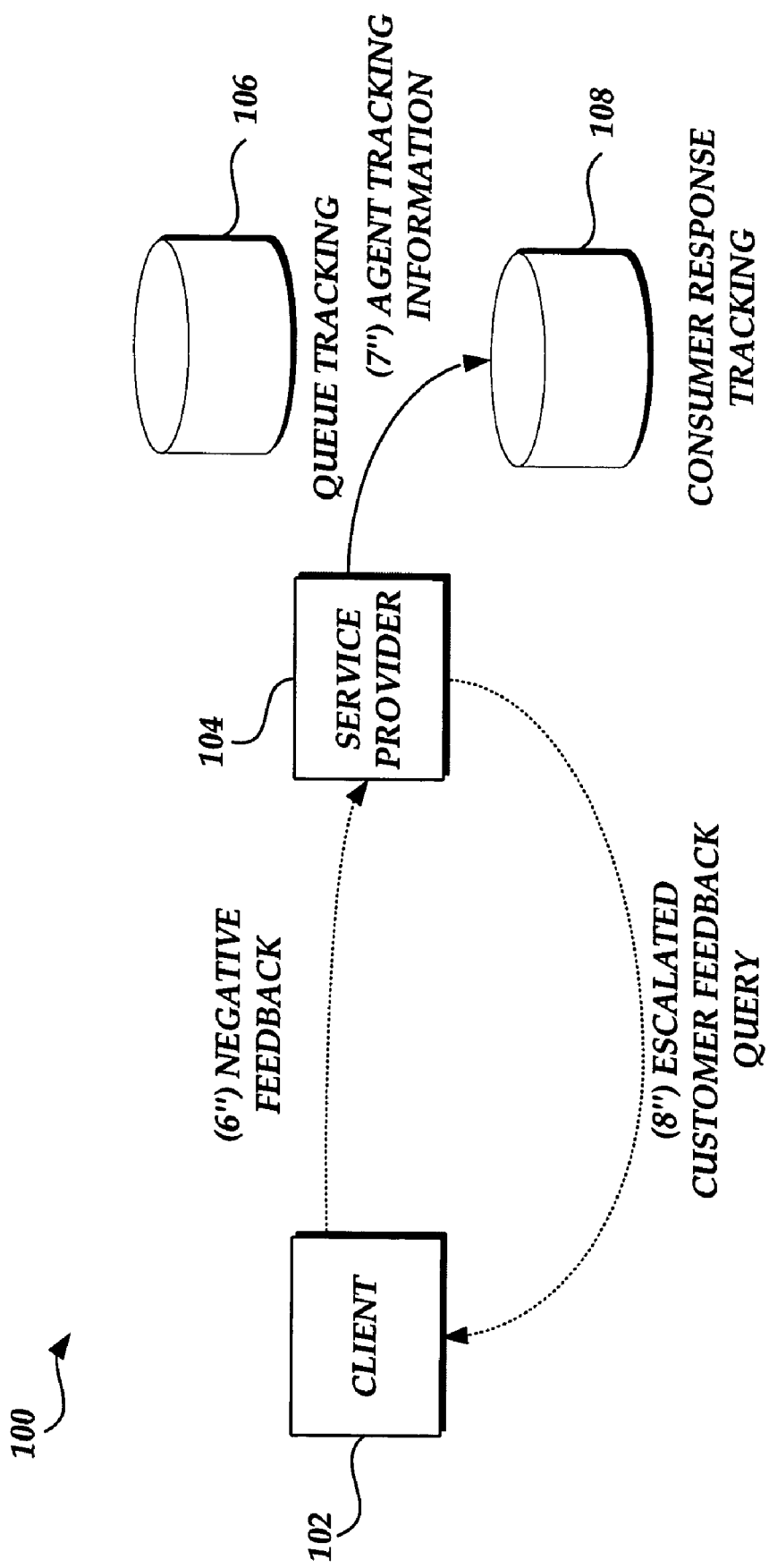

With reference now to FIG. 2B, an embodiment for processing negative feedback will be described. As an alternative to the embodiment described in FIG. 2A, a user selects the negative feedback link 308 (FIG. 3), that instantiates a specialized content request from the service provider computing device 104. The service provider computing device 104 receives the content request from the client computing device 102 and processes the information included in the request. In one aspect, the service provider computing device 104 can utilize the embedded customer service agent identification information in the negative feedback link to update the customer response data tracking repository 108 to indicate a unsuccessful consumer inquiry response similar to the processing of positive feedback. In another aspect, the service provider computing device 104 can generate a second responsive communication acknowledging the positive feedback. The second responsive communication may be another electronic message requesting additional information from the consumer to escalate the consumer inquiry. Alternatively, the second response communication may be a Web page generated on the client computing device 102. In an illustrative embodiment of the present invention, the Web page can correspond to a specialized consumer feedback site provided by the merchant to encourage additional transactions.

Figure 5:
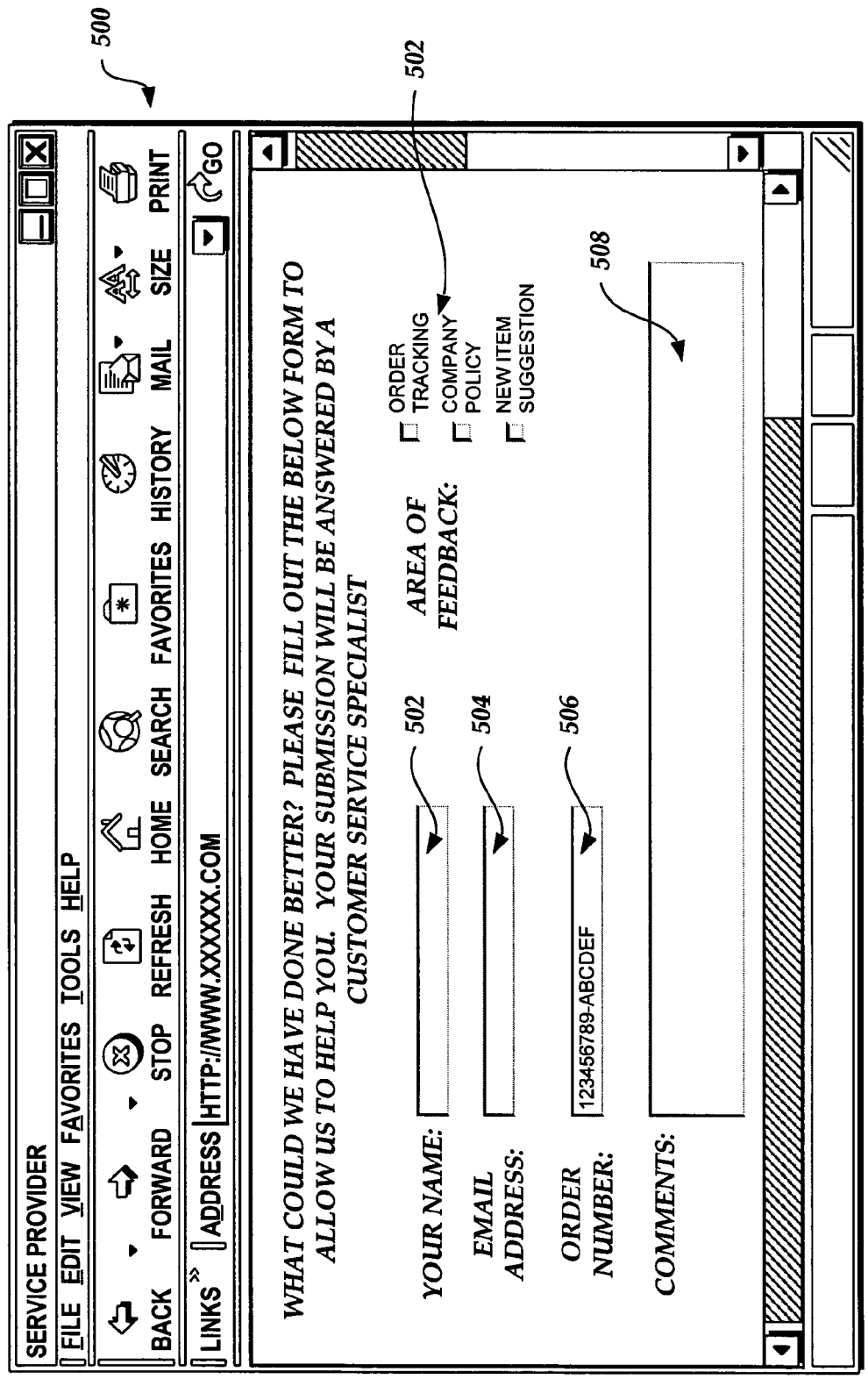
FIG. 5 is a block diagram illustrative of a screen display generated by a client computing device corresponding to the receipt of negative feedback by a service provider in accordance with the present invention.

FIG. 5 is a block diagram illustrative of a screen display 500 generated by the client computing device 102 corresponding to the receipt of negative feedback. The screen display 500 corresponds to a traditional graphical user interface Web browser software application screen display having a variety of navigational and file controls for the user. The screen display 500 includes a variety of tools for obtaining additional consumer feedback. As illustrated in FIG. 5, the screen display 500 includes a first portion 502 for obtain a consumer name, a second portion 504 for obtaining a consumer email address, a third portion 506 to obtain a transaction tracking number and a fourth portion 510 for obtaining additional consumer comments. In an illustrative embodiment of the present invention, some of the portions of the screen display 500 may be automatically populated with information previously provided by the consumer. Further, the screen display 500 can include a fifth portion 512 that provides a selection of predefined areas of consumer feedback. For example, the fifth portion 512 may include a graphics, such as radio buttons, check boxes, pull down menus, and the like, that allow the consumer to select one of a variety of predefined feedback comments. One skilled in the relevant art will appreciate that additional and/or alternative screen display configurations may be practiced with the present invention.

In an illustrative embodiment of the present invention, the merchant computing device 104 may utilize the consumer feedback stored in the customer response data tracking repository 108 for various information processing functions. In one aspect, consumer feedback can be considered individually to obtain information about a particular consumer inquiry and/or to assist in the resolution of the consumer inquiry. In one embodiment, a consumer inquiry may be routed to customer service agents that are designated to prepare responses to particular types of consumer inquiries. For example, customer service agents may receive special training to respond to specific inquiries. Further, in another embodiment, a consumer inquiry may be routed to customer service agents that are designated to prepare responses for particular customers or types of customers. In a further embodiment a follow up consumer inquiry may be routed to the particular customer service agent that prepared a previous response or had some other association with the particular consumer inquiry.

In another aspect of information processing, the consumer feedback in the customer response data tracking repository 108 may be considered in aggregate to obtain information about groups of consumer inquiries, customer service agents and/or customers. In one embodiment, sample predefined response language may be tested and/or compared to other predefined language by tracking the aggregate consumer feedback for responses including the targeted language. Similarly, in another embodiment, consumer feedback relating to particular subject matter, such as a merchant policy, can be tracked to determine public opinion/acceptance of the subject matter. In a further embodiment, consumer feedback from particular customers can be tracked to develop customer profiles for identifiable customers. The customer profiles can correspond to at tracking of the frequency of feedback, the type of feedback provided to the merchant and/or the best manner in which to resolve any outstanding issues. In still another embodiment, consumer feedback can be processed according to particular customer service agents to track consumer inquiry resolution rates. In one aspect, the resolution rates may be considered in terms of a percentage of positive/negative inquiries over a total number of inquiries. In another aspect, the resolution rates may be considered in terms of the number of initial positive/negative results over the total number of resolved inquiries. Still further, the statistical information may be utilized to train customer service agents.

Although a number of individual and aggregate processes have been described, one skilled in the relevant art will appreciate that additional statistical or other processes may be utilized in accordance with the present invention.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for processing customer service inquiries, the method comprising:
   receiving by a computing device a customer service inquiry from a client, wherein the client is associated with an electronic mail reply address;
   automatically calculating by a computing device an estimate of time of transmission to the client of a responsive communication that corresponds to the customer service inquiry, wherein the estimate of time of transmission is calculated based on selected criteria that include a processing priority assigned to the client;
   providing by a computing device the estimate of time of transmission to the client;
   generating the responsive communication corresponding to the customer service inquiry from the client, wherein the responsive communication includes one or more information components corresponding to a response from a customer service agent and an embedded unresolved customer service feedback link, wherein the embedded unresolved customer service feedback link is associated with expiration data that causes the link to expire based on a use limit that limits the number of times the link can be utilized;
   transmitting the responsive communication to the client at the electronic mail reply address associated with the client;
   receiving by a computing device a user selection of the embedded unresolved customer service feedback link; and
   automatically generating by a computing device an escalated customer service query in response to the selection of the embedded unresolved customer service feedback link.

2. The method as recited in claim 1, wherein obtaining receiving a customer service inquiry includes: generating a customer service Web page including one or more fields for completing a customer service inquiry;
   receiving user input to the one or more fields of the customer service Web page; and
   generating the customer service inquiry from the user input.

3. The method as recited in claim 1, wherein obtaining receiving a customer service inquiry includes receiving an electronic mail message corresponding to a customer service inquiry.

4. The method as recited in claim 1, wherein the escalated customer service query includes a Web page including one or more fields for obtaining additional client information.

5. The method as recited in claim 1, wherein calculating the estimate of time of transmission of a responsive communication includes:
   determining a size of a customer service inquiry queue;
   obtaining an estimated rate of processing customer service inquiries; and
   calculating the estimate of time of transmission by dividing the size of the customer service inquiry queue by the estimated rate of processing customer service inquiries.

6. The method as recited in claim 1, wherein at least a subset of clients are associated with the processing priority, the processing priority guaranteeing a responsive communication within a threshold time, and wherein calculating the estimate of time of transmission of a responsive communication includes:
   determining whether the client is associated with the processing priority; and
   if the client is associated with the processing priority, providing the threshold time as the estimate of time of transmission of a responsive communication.

7. The method as recited in claim 1, wherein the responsive communication includes two or more textual components corresponding to a response from a customer service agent, and wherein the embedded unresolved customer service feedback link is embedded between the two or more textual components.

8. The method as recited in claim 1 further comprising:
associating the user selection of the embedded unresolved customer service feedback link to a customer service agent providing the one or more information components of the responsive communication; and
updating customer service agent tracking information to indicate an unresolved customer service inquiry.

9. The method as recited in claim 8 further comprising generating a customer service agent metric based on the customer service agent tracking information.

10. The method as recited in claim 1, further comprising:
in response to user selection of the embedded resolved customer service feedback link, generating a redirect to a service provider Web page.

11. The method as recited in claim 10, wherein the service provider Web page includes a customized client thank you.

12. The method as recited in claim 1, wherein the embedded unresolved customer service feedback link is a customized link.

13. The method as recited in claim 1, wherein the embedded unresolved customer service feedback link is represented as a graphic image.

14. The method as recited in claim 1 further comprising storing feedback information corresponding to the selection of the unresolved customer service feedback link.

15. The method as recited in claim 14 further comprising aggregating information corresponding to the selection of the unresolved customer service feedback link.

16. The method as recited in claim 15 further comprising generating a consumer profile corresponding to the aggregated information corresponding to the selection of the unresolved customer service feedback link.

17. A method for processing customer service inquiries, the method comprising:
receiving by a computing device a customer service inquiry from a client, wherein the client is associated with an electronic mail reply address;
automatically calculating by a computing device an estimate of time of transmission to the client of a responsive communication that corresponds to the customer service inquiry, wherein the estimate of time of transmission is calculated based on selected criteria that include a processing priority assigned to the client;
providing by a computing device the estimate of time of transmission to the client;
generating the responsive communication corresponding to the customer service inquiry from the client, wherein the responsive communication includes one or more information components corresponding to a response from a customer service agent, a first embedded link corresponding to feedback of an unresolved customer service inquiry and a second embedded link corresponding to feedback of a resolved customer service inquiry, wherein the first embedded link and the second embedded link are associated with expiration data that causes the first embedded link and the second embedded link to expire based on a use limit that limits the number of times the respective link can be utilized;
transmitting the responsive communication to the client at the electronic mail reply address associated with the client;
receiving by a computing device a user selection of the first or second embedded link;
processing the feedback associated with the user selection of the first or second embedded link; and
automatically generating by a computing device a responsive action corresponding to the processing of the feedback associated with the user selection.

18. The method as recited in claim 17, wherein receiving a customer service inquiry includes:
generating a customer service Web page, including one or more fields for completing a customer service inquiry;
receiving user input to the one or more fields of the customer service Web page; and
generating the customer service inquiry from the user input.

19. The method as recited in claim 17, wherein receiving a customer service inquiry includes receiving an electronic mail message corresponding to a customer service inquiry.

20. The method as recited in claim 17, wherein the user selection is the first embedded link corresponding to feedback of an unresolved customer service inquiry and wherein generating a responsive action corresponding to the processing includes generating an escalated customer service query in response to the selection of the embedded unresolved customer service feedback link.

21. The method as recited in claim 20, wherein the escalated customer service query includes a Web page including one or more fields for obtaining additional client information.

22. The method as recited in claim 17, wherein the user selection is the second embedded link corresponding to feedback of a resolved customer service inquiry and wherein generating a responsive action corresponding to the processing includes generating a redirect to a service provider Web page.

23. The method as recited in claim 22, wherein the service provider Web page includes a customized client thank you.

24. The method as recited in claim 17, wherein calculating the estimate of time of transmission of a responsive communication includes:
determining a size of a customer service inquiry queue;
obtaining an estimated rate of processing customer service inquiries; and
calculating the estimate of time of transmission by dividing the size of the customer service inquiry queue by the estimated rate of processing customer service inquiries.

25. The method as recited in claim 17, wherein at least a subset of clients are associated with the processing priority, the processing priority guaranteeing a responsive communication within a threshold time, and wherein calculating the estimate of time of transmission of a responsive communication includes:
determining whether the client is associated with the processing priority; and
if the client is associated with the processing priority, providing the threshold time as the estimate of time of transmission of a responsive communication.

26. The method as recited in claim 17, wherein the responsive communication includes two or more textual components corresponding to a response from a customer service agent, and wherein the first and second embedded links are embedded between the two or more textual components.

27. The method as recited in claim 17 further comprising associating the user selection of the first or second embedded links to a customer service agent providing the one or more information components of the responsive communication and updating customer service agent tracking information to indicate the client selection.

28. The method as recited in claim 27 further comprising generating a customer service agent metric based on the customer service agent tracking information.

29. The method as recited in claim 17, wherein at least one of the first and second embedded links is a customized link.

30. The method as recited in claim 17, wherein at least one of the first and second embedded links is represented as a graphic image.

31. The method as recited in claim 17 further comprising storing feedback information corresponding to the selection of the first or second embedded links.

32. The method as recited in claim 31 further comprising aggregating receipt of the information corresponding to the selection of the first or second embedded links.

33. The method as recited in claim 32 further comprising generating a consumer profile corresponding to the aggregated information corresponding to the selection of the first or second embedded links.

34. A tangible computer-readable medium having computer-executable components stored thereon for causing a computing apparatus to process customer service inquiries, the computer-executable components comprising:

a responsive communication component that includes one or more information components corresponding to a response to a customer service inquiry of a customer from a customer service agent, wherein the responsive communication component is configured to cause the computing apparatus to automatically calculate an estimate of time of transmission of the response that corresponds to the customer service inquiry, wherein the estimate of time of transmission is calculated based on selected criteria that include a processing priority associated with the customer and wherein the estimate of time of transmission is automatically provided to the customer;

an embedded unresolved inquiry component corresponding to an indication of an unresolved response to the customer service inquiry, wherein the embedded unresolved inquiry component is configured to include in the response a first link to a service provider, wherein the first link to the service provider is associated with expiration data that causes the first link to expire; and an embedded resolved inquiry component corresponding to an indication of a resolved response to the customer service inquiry, wherein the embedded resolved inquiry component is configured to include in the response a second link to the service provider, wherein the second link to the service provider is associated with expiration data that causes the second link to expire, wherein the expiration data associated with the first link and the second link includes a use limit that limits the number of times the respective link can be utilized.

35. The computer-readable medium as recited in claim 34, wherein the responsive communication component is configured to include in the response two or more textual components, and wherein the first link and the second link are embedded in the response between the two or more textual components.

36. The computer-readable medium as recited in claim 34, wherein the first link to the service provider corresponds to a link to an escalated customer service inquiry page.

37. The computer-readable medium as recited in claim 34, wherein the second link to the service provider corresponds to a link to a service provider home page.

38. The computer-readable medium as recited in claim 37, wherein the service provider home page includes a customized client thank you.

39. The computer-readable medium as recited in claim 34, wherein the response is embodied as an electronic mail message from the service provider.

40. The computer-readable medium as recited in claim 34, wherein at least one of the first and second links is a customized link.

41. The computer-readable medium as recited in claim 34, wherein at least one of the first and second links is represented as a graphic image.

\* \* \* \* \*

UNITED STATES PATENT AND TRADEMARK OFFICE
CERTIFICATE OF CORRECTION

PATENT NO. : 7,711,653 B1  Page 1 of 1
APPLICATION NO. : 10/668043
DATED : May 4, 2010
INVENTOR(S) : M. L. Denham et al.

It is certified that error appears in the above-identified patent and that said Letters Patent is hereby corrected as shown below:

| COLUMN | LINE | |
|---|---|---|
| 10 (Claim 2, line 1) | 26 | "wherein obtaining receiving" should read --wherein receiving-- |
| 10 (Claim 2, line 2) | 27 | "includes: generating a" should read --includes: {begin new paragraph} generating a-- |

Signed and Sealed this

Seventh Day of September, 2010

David J. Kappos
*Director of the United States Patent and Trademark Office*